W. W. CARPENTER.
CONDUIT COUPLING.
APPLICATION FILED JAN. 23, 1914.
1,175,600.
Patented Mar. 14, 1916.
3 SHEETS—SHEET 1.
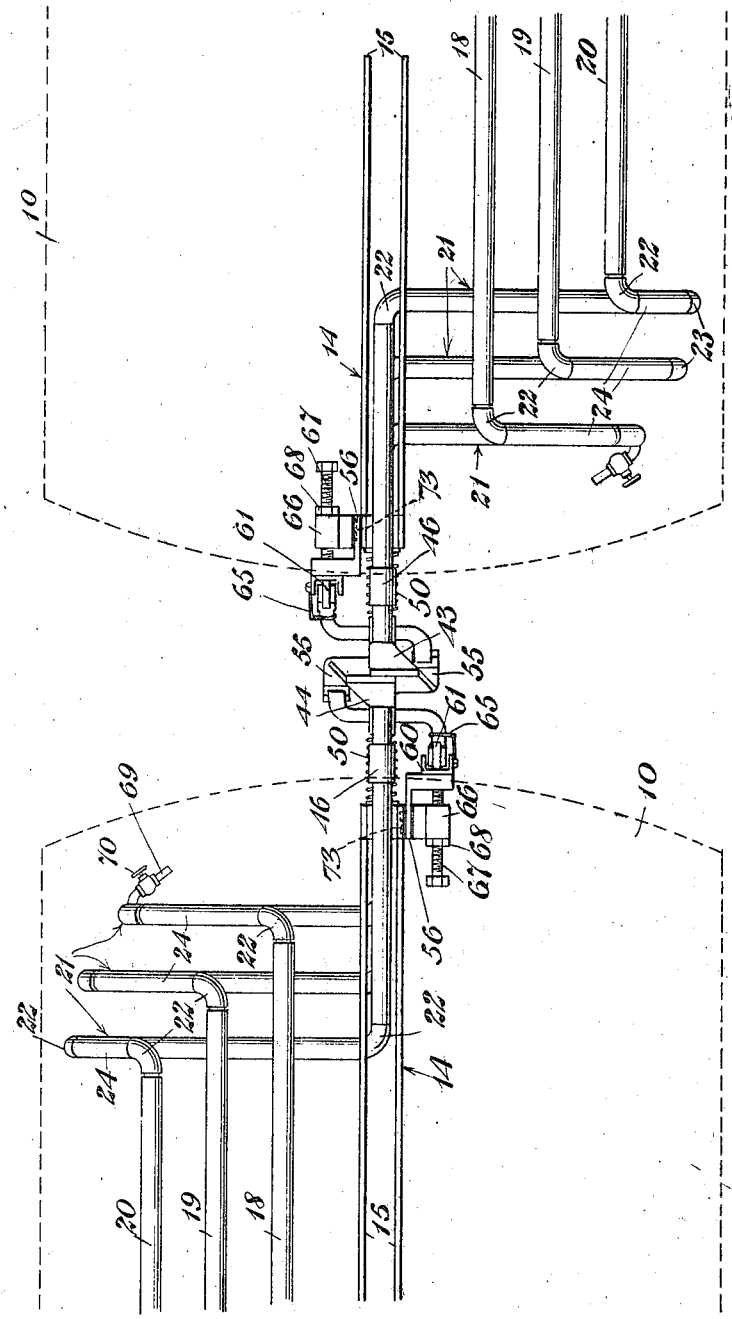
WITNESSES
INVENTOR
Wallace W. Carpenter
BY
ATTORNEYS W. W. CARPENTER.
CONDUIT COUPLING.
APPLICATION FILED JAN. 23, 1914.
1,175,600.
Patented Mar. 14, 1916.
3 SHEETS—SHEET 2.
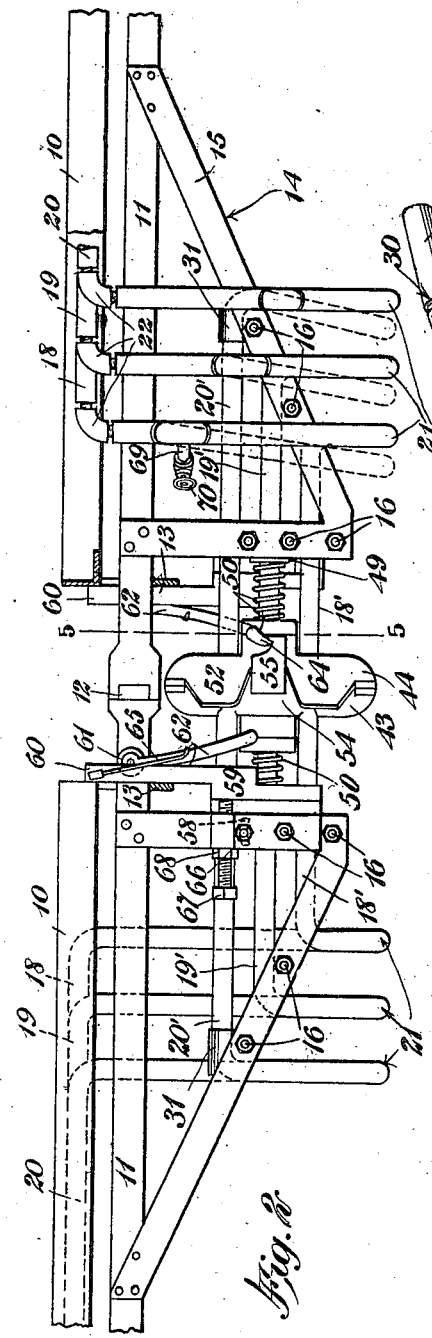
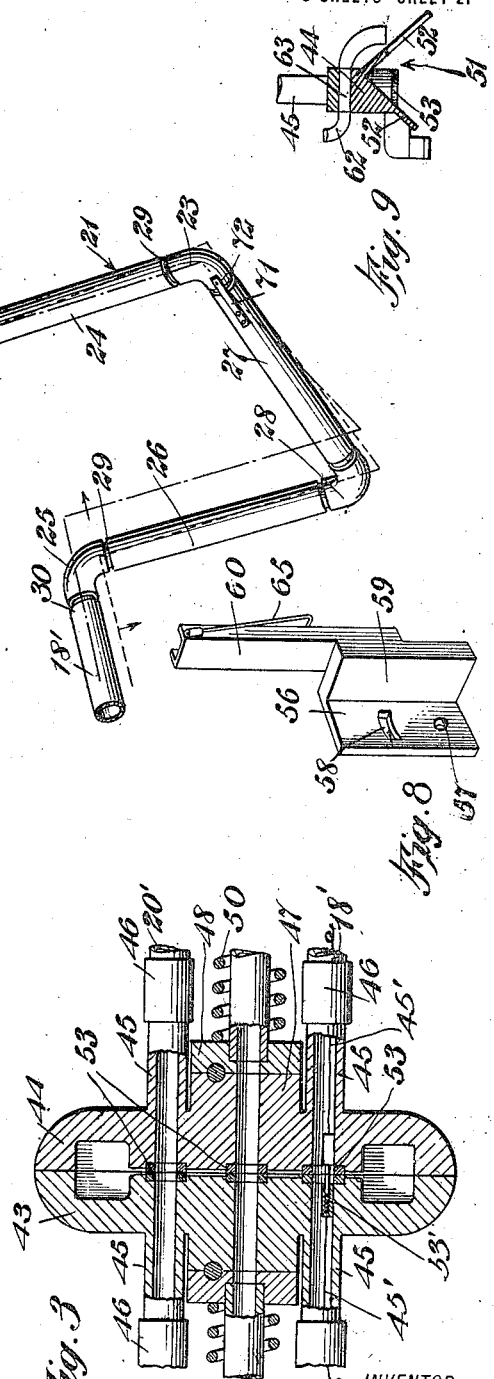
WITNESSES
INVENTOR
Wallace W. Carpenter
BY
ATTORNEYS W. W. CARPENTER.
CONDUIT COUPLING.
APPLICATION FILED JAN. 23, 1914.
1,175,600.
Patented Mar. 14, 1916.
3 SHEETS—SHEET 3.
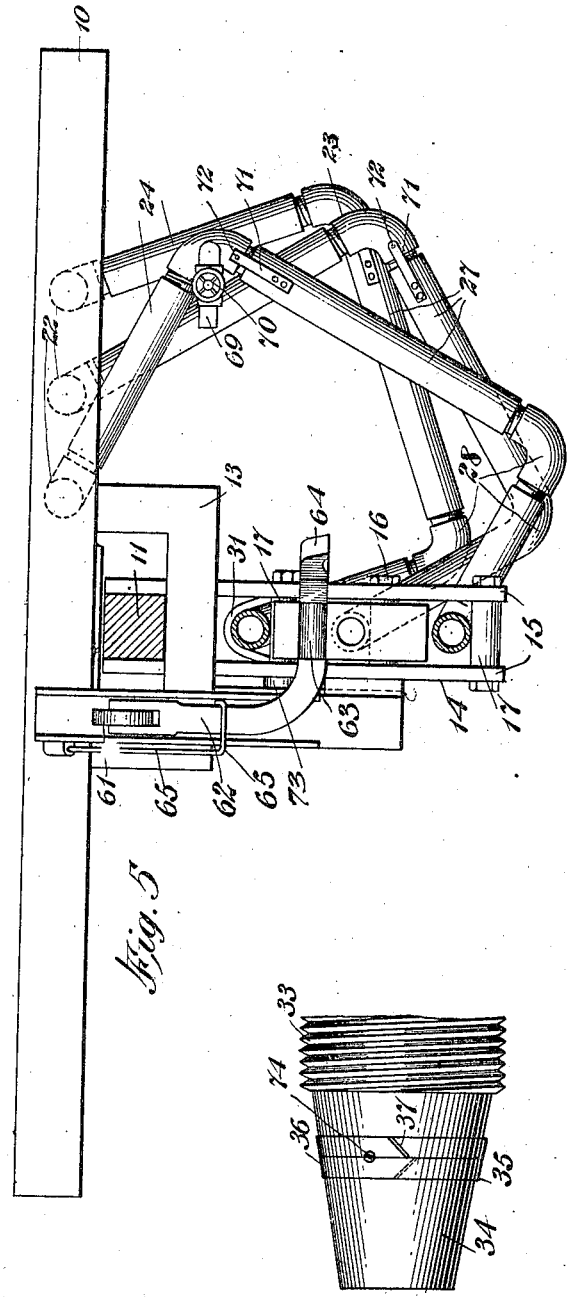
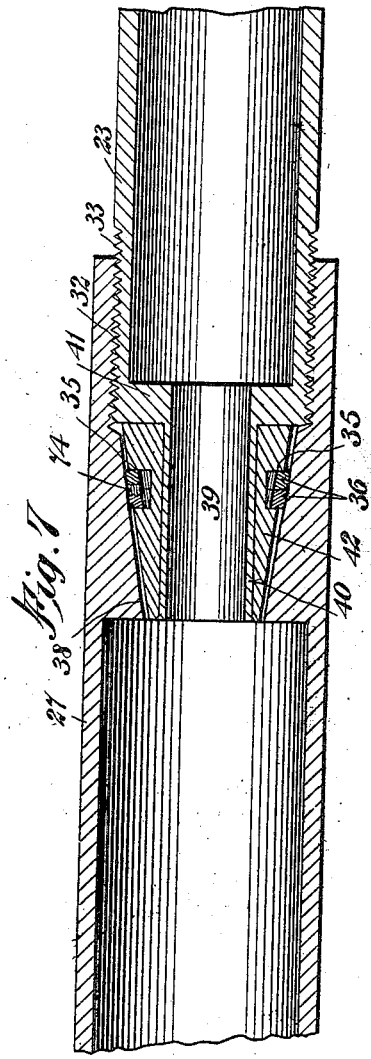
WITNESSES
INVENTOR
Wallace W. Carpenter
BY
ATTORNEYS

UNITED STATES PATENT OFFICE.

WALLACE W. CARPENTER, OF NEW YORK, N. Y.

CONDUIT-COUPLING.

1,175,600.  Specification of Letters Patent.  Patented Mar. 14, 1916.

Application filed January 23, 1914.  Serial No. 813,893.

*To all whom it may concern:*

Be it known that I, WALLACE W. CARPENTER, a citizen of the United States, and a resident of the city of New York, borough of Manhattan, in the county and State of New York, have invented a new and Improved Conduit-Coupling, of which the following is a full, clear, and exact description.

This invention has relation to improved conduit couplings and is especially adapted for use in connection with railway rolling stock or other coupled vehicles of transportation for the purpose of carrying fluids, gases, electric currents and the like, these constituting the source of power or energy for the driving of the train and for stopping the same by applying the brakes, for lighting purposes, or what not.

A further object of the invention is to provide a coupling between the conduits of railway rolling stock or cars which will insure positive connection of the conduits in such a manner as to prevent the escape of fluid or to cause the accurate connection for the carrying of electric current or the like after the coupling of the drawheads or bars and in such a manner as to relieve the coupling heads for the conduits of excess concussions or shocks and to cause the same to be more tightly drawn together as the cars are coupled and as they approach each other.

A still further object of the invention is to obviate the necessity of employing flexible conduits usually made in tubular lengths sufficient to permit the cars to turn at various angles, one with relation to the other, but which have been found objectionable owing to the fact that much trouble and annoyance has been caused by the bursting of the same as well as the rapid deterioration thereof resulting in rendering them unfit for service and safety, and for this purpose a series of metallic conduits are employed which are so connected to the coupling heads of the conduit coupling as distinct from the coupling connecting the cars and carried by the usual drawheads, in which the drawheads will suffice to carry the conduit couplings, while novel arrangements of movable parts are provided between the line pipes beneath the floor or truck of the car as to permit the desired angular movements as are required and as are necessary in turning curves and in such a manner to prevent the escape of fluids or gases and to prevent loose connections.

A still further object of the invention is to provide in connection with a series of angularly movable pipe sections or train pipes, novel means for causing the establishment of a continuity of flow between the train pipes automatically as the cars are coupled, such parts being so mounted as to be relieved of shocks incident to the coupling of the cars and being such that the abutting parts are always in corresponding position to form a perfect connection when the cars are coupled.

A still further object of the invention is to provide a novel locking device for securing the conduit couplings together, in combination with novel means for supporting the train line pipes which, although of metal, are allowed movement in either direction necessary to permit them to remain intact during the travel of the train, thus eliminating the use of the usual hose or flexible connections and resulting in a device of greater permanency and durability, although means are provided for permitting the use of a rubber conduit so that those cars which are equipped with the improvement may be used with cars not equipped therewith.

With the above and other objects in view, the invention resides more particularly in the peculiar combination and arrangement of parts which will be illustrated as a preferred embodiment in the accompanying drawings and described in the specification.

Reference is to be had to the accompanying drawings forming a part of this specification, in which similar characters of reference indicate corresponding parts in all the views and in which—

Figure 1 is a plan view of the invention showing the relation thereof when applied to adjacent cars when the latter are coupled, fragmentary portions of the cars being indicated in dotted lines; Fig. 2 is a side elevation of the structure shown in Fig. 1; Fig. 3 is an enlarged vertical longitudinal sectional view of the conduit couplings, with the connections of the train line pipes in elevation; Fig. 4 is a detail perspective view of one of the connections or fittings of the train pipe between one of the coupling heads for the pipes and the pipe fixed beneath the car body and floor; Fig. 5 is an enlarged vertical sectional view taken on the line 5—5 of Fig. 2; Fig. 6 is a detail perspective elevation of one end of a conduit at which the improved coupling is provided; Fig. 7 is an enlarged longitudinal sectional view showing the improved coupling in slightly modified form; Fig. 8 is a detail perspective view of a guide and adjusting member for the locking means between the coupling heads of the conduits; and Fig. 9 is a horizontal cross sectional view of one of the coupling heads.

In the illustrated embodiment of the invention, the numeral 10 designates the cars to be coupled, the floors or platforms thereof being illustrated and showing suitable drawbars or heads 11 of the usual or any preferred type and adapted to be connected by the Janney or any other improved form of coupling 12, it being understood that the drawbars take the shock incident to the coupling of the cars. My improved coupling and the connections or pipes leading therefrom in a manner to permit the use of metallic pipe sections so as to eliminate the use of the ordinary flexible pipe connections between the train pipes, are all carried by the drawbars in conjunction with the sections of the train pipes permanently carried by the cars and usually beneath the platforms thereof. Depending from the ends of the car platforms are slotted guides 13 through which the respective drawbars project and in which the drawbars are also supported but permitted to move in different angular directions to either side to compensate for the variances in the relative positions of the cars and coupled parts to each other when the train is traveling on a straight track or rounding a curve.

In supporting the parts as above mentioned hangers 14 are suspended from each drawbar beneath the car platforms, said hangers comprising spaced angular frames 15 suitably bolted to the drawbars and connected to each other by bolts or the like 16 at suitable spaced points, with intermediate spacing sleeves 17 engaged on the bolts between the frames of the hangers to hold the frames equi-distantly spaced apart. The train pipes are indicated by the numerals 18, 19 and 20, the same being anchored in any usual manner beneath the floor or platform of the car and connected to the usual mechanism for the operation of the brakes, for lighting purposes or otherwise, it being understood that any number of conduits may be arranged as shall be found desirable or necessary and that in the case of transmitting electricity between the cars, the usual insulated current conducting wires or conduits will simply be run through the pipes. As illustrated in Fig. 3 of the drawings, the lower conduits 45 have conductor wires 45' extending therethrough and contacts or connectors 53' are provided for closing the circuit in the coupling heads so brought together, but the construction of these contacts or connectors is not embodied as a part of the invention, as any form of connector may be employed without affecting the operation of the device. These wires are preferably run through only one of the pipes, such as the signal pipe which contains air under a very low pressure and which needs no valves so that the electric wires can be readily run through the same to connect when the cars come together and are coupled, without interfering with the operation of the signal whistle in the engineer's cab. It will be observed that the pipe sections 18, 19 and 20 are horizontally disposed or supported and are connected to portions 18', 19' and 20' which are disposed between the frames of the hangers 14 and which are supported upon the bolts or sleeves of the latter in such a manner as to reduce friction between the parts during the movements of the pipes in a manner to be hereinafter more fully explained. These connections are each made up of substantially U-shaped interposed fittings 21, as more clearly indicated in Fig. 4 of the drawings, each being composed of an elbow 22 connected to an adjacent pipe section carried beneath the car platform, each elbow 22 being in turn coupled to an elbow 23 extending at right angles from the direction of extent of the first mentioned elbow horizontally or substantially so, by means of a nipple 24, the interior portions of which at its ends are oppositely threaded to engage oppositely threaded parts or interior threads on the elbows 22 and 23. The portion 18' of the train pipe 18 is connected by an elbow 25 with a nipple 26 at right angles thereto, the nipple 26 being in turn connected to a nipple 27 by means of an elbow 28 so that the nipple 27 forms the bight portion of the connection. As the drawbar is movable forwardly and backwardly or longitudinally of the car as well as sidewise, these connections will permit desired movements of the pipes at the points 29 and 30, the parts during the longitudinal movement, moving on the points 29 as pivots and on the points 30 as pivots during the sidewise movements respectively.

The train pipes are disposed in spaced relation and sufficient space is allowed between each of the U-shaped connections 21 constituting the universally movable parts to compensate for the variances in the positions of the cars one with respect to the other, thus disposing the pipe sections 18', 19' and 20' in stepped relation on the inclined parts of the frames 15 composing the hangers 14. The uppermost sections are held from outward displacement by a guide or cover strip 31, thus avoiding the natural tendency of the coupling heads of the conduits to swing the inner ends of the pipes upwardly on the connecting bolts 16 as pivots, it being understood that such pipe sections 18′, 19′ and 20′ are free to move owing to the flexibility of the connections.

Special couplings or joints are provided between the parts of the pipe sections which are adapted to move at the points 29 and 30 as just described, and in addition the elbows are oppositely threaded with respect to the ends which are coupled to the nipples whereby the elbows can be connected by the nipples at their ends or disconnected by turning the nipples in the proper direction so as to permit the nipple sections to be joined to the respective elbows or conveniently displaced should occasion to do so arise. For this purpose each nipple section is interiorly and oppositely threaded at its ends as shown at 32 and the elbows connected thereto are correspondingly exteriorly threaded as shown at 33 and further provided with tapered extremities 34 which taken from a line traversing the end of the threaded area, forms a substantially truncated cone. As shown in Fig. 6, this extension is integral with the threaded portion and is provided with an annular groove 35 in which a pair of packing rings 36 are mounted with their spaced extremities 37 positioned at diametrically opposite points or out of alinement to form an airtight joint when fitted within a correspondingly tapered bore 38 of the attached nipple section. A set screw 74 is threaded into coacting recesses of the packing rings 36 to hold the latter positively against independent rotation. In the form illustrated in Fig. 7 of the drawings the bore of the elbow 23, only a fragmentary portion of which is shown, has a reduced portion 39 formed by an extension 40 of an internal flange 41 at the end of the threaded part 33 and a truncated bushing 42 is fixed on the portion 40 and grooved to receive the packing rings in the same manner as heretofore described. By providing the bushing of brass or other soft or bronze metal against the hard metal nipple sections, a grinding wear is afforded to produce a tight fit and a correspondingly air and water tight joint. The variances in the sizes of the bores can be changed in accordance with the requirements. The purpose of employing this joint is apparent owing to the fact that the threads are made to permit free turning of the connected parts, the packing rings alone remaining stationary to close the intervening space so that the joints or points of connection 29 and 30 will simultaneously move during the angular movements of the pipe sections 18′, 19′ and 20′ with the respective coupling heads of these pipes or conduits in moving sidewise and longitudinally. A spring catch 71 is fixed to the nipple section 27 of each flexible connection between the stationary conduits carried by the car and the pipe sections or conduits supported by the hangers, and each catch is provided at one end with a pin 72 to engage a notch in the adjacent elbow 23 so as to hold these parts against independent movement or rotation and thereby more effectively insure movement of the parts at the connections 29 and 30, as well as permit the use of a simple male and female union between the parts 23 and 27 if desired.

The coupling heads or self-registering units for the conduits are indicated by the numerals 43 and 44, each consisting of a body portion or casting of substantially V-shape in cross section and provided with upper and lower tubular extensions 45 coupled to the pipe sections 20′ and 18′, respectively, as shown at 46. These extensions are provided with orifices or bores alining with similar orifices in the heads of which the extensions form parts, and each head is further provided with an intermediate extension 47 to which a bearing plate 48 is secured, and engaged on the pipe section or conduit 19′ between this plate and a bearing member or washer 49 mounted on the conduit in contact with the hanger 14, is an expansible coiled spring 50 which normally tends to hold the parts, including the conduit coupling head or unit, distended and properly positioned to register and connect with a companion head, the two being located on diverse cars. The cross section of one of the coupling heads is more clearly shown in Fig. 9 of the drawings, thus forming V-shaped openings or recesses 51 between the sides or wings 52 thereof so as to cause the parts to be guided into co-engagement and to bring the orifices of the respective heads into alinement and registration irrespective of slight variations in relative positions of the heads. Packing rings or suitable bushed seats 53 are provided at the terminals of each orifice of the heads so that when the two are brought in contact a very tight joint obviating the escape of a fluid body is provided. The wings 52 at one side of each head are spaced apart to provide a flaring opening 54 and the opposite walls of the heads are propided exteriorly with notched keepers 55 which project slightly beyond the vertical edges of said flanges and are adapted to engage in the respective openings 54 in opposed heads during the automatic coupling thereof, as will be hereinafter more fully described.

Carried by each hanger 14 at the side thereof in rear of the notched keeper is a guide and adjusting member for a pivoted bolt constituting a locking and camming device to positively hold the coupling heads connected, a part of such device being shown in perspective in Fig. 8 of the drawings and comprising an angular member having a flanged portion 56 pivoted through an aperture 57 to the hanger and having an arcuate slot 58 permitting limited pivotal movements thereof. A shoulder or nut 73 is disposed on each of the bolts which engage through the hangers and the flanged portion 56 of each guide and adjusting member, so that the frames of the hangers will be clamped tight while permitting free movements of the guides and adjusting members. This angular member has a front portion or flange 59 disposed at right angles thereto and such front portion has a vertical extension 60 which is of channel form and which serves to receive a guide and bearing roller 61 at the upper end of one arm of a bolt or lever 62 which, through the instrumentality of a reduced circular portion 63 is journaled in suitable co-acting semi-circular recesses in the co-acting faces of the extension 47 and the plate 48 or in a bearing thus produced. The other arm of the lever is directed downwardly in the form of an engaging portion 64 which is tapered and bent slightly in the form of a hook to engage against the inner face of the upward projection of the notched keeper 55 so that when the parts are brought into engagement the bolts or levers will be swung on their pivots, due to the movement of the coupling heads 43 and 44 in opposite directions, so as to move the upwardly extending arms upwardly with the rollers 61 bearing on the extensions 60 to separate or swing the depending arms or engaging portions in opposite directions in such a manner as to draw the coupling heads toward each other and in positive coupling position to effect an air-tight union. An angular spring 65 is carried by each extension 60 and has a horizontal part which exerts pressure against the upwardly extending arms of the bolts to cause the same to remain in contact with the walls of the extensions between the side flanges forming the channels thereof.

A bracket 66 is anchored to each hanger outwardly of the portions 56 of the adjusting members and guides, being bolted thereto by the same bolts which pivotally support said members and each bracket has an enlarged upper portion through which an adjusting screw 67 is engaged so as to contact with the rear face of the portion 59 and be held by a jam nut 68 to permit an adjustment of the angular movement of the adjusting member and guide which regulates the pivotal movements of the bolts and the corresponding angular movements of the arms thereof. In this manner it will be seen that as the heads tend to separate after being coupled, they will be more tightly drawn together by the bolts engaged in the respective notched projections until the cars themselves are uncoupled, when the springs 50 will assist in separating the coupling heads.

From the foregoing description in connection with the accompanying drawings, it will be seen that a coupling device and system of conduit connections provided in accordance with my invention will permit the use of metallic parts in such a manner as to render the device more durable and efficient than the usual flexible elastic conduits for connecting train pipes. Furthermore, the parts by being further automatically coupled in a fluid-tight manner will obviate the necessity of manually coupling cars, and blowouts and other obnoxious features of the heretofore commonly used devices will be entirely avoided, but at the same time the connections between the coupling heads and the stationary parts of the train pipes carried by the cars will provide for sufficient relative movements as not to interfere with the variances in the relative positions of the cars or due to the play allowed the trucks or the wheel flanges but by means of valved extensions 69, the valves of which are indicated by the numeral 70, a car not equipped with the improvement may be coupled to a car which is equipped with the improvement, and in this way provision is made for the connection of the cars until such time as all cars are equipped with the improvement.

To permit the use of the valved extension 69, the devices 18', 19' and 20' will have suitable valves (not shown) for closing them so that the fluid will not escape when the extensions are used.

Having thus described my invention, what I claim as new and desire to secure by Letters Patent is:—

1. The combination with cars to be coupled and coupling heads suitably supported; of an outwardly projecting keeper carried by one side of each head, an angular lever pivotally mounted through each head and having a downwardly projecting hooked arm at one side and an upwardly projecting curved arm at the other side, a roller at the upper end of each arm, an angular adjusting member and guide pivotally supported by each car, said members each having a channel-shaped vertical portion in which the roller of each upwardly extending arm is engaged, a spring carried by each vertical portion and bearing against the respective curved arm to hold the rollers in contact with the vertical portions to move the hooked arms upwardly, whereby when the heads are brought together said hooked arms will engage the keepers to draw the heads together, and means to limit the pivotal movements of the angular members.

2. The combination with a car, horizontal stationary conduits carried by and extending under the car and disposed in a horizontal plane, a draw-bar, a hanger carried thereby, horizontal conduits mounted in and movable with the hanger and disposed in a vertical plane, and flexible U-shaped connections uniting the corresponding stationary and movable conduits together.

3. The combination with conduits of cars adapted for longitudinal and lateral displacement; of hangers for supporting the conduits, coupling heads having orifices communicating with the conduits and removably connected thereto, said coupling heads embodying body portions having side flanges to guide the heads together, packing means at the extremities of the orifices to contact with the heads so coupled, one flange of each head having an intermediate opening, a notched projection carried by the opposite flange of each head and adapted to enter the opening of the other flange of each head, a pivoted locking member carried by each head to engage the notched projection of the other head when the cars are coupled and the conduit heads are brought together, said locking means embodying a bolt pivoted to the head and having a downwardly extending engaging portion at one side and an upwardly extending engaging portion at the other side, and means to vary the inward movement of the upper extremity of the last named portion and to cause the pivoting of the bolts when the heads are shifted longitudinally during their engagement, whereby the downwardly projecting portions will engage the notched projections and draw the heads together.

4. The combination of a car, a draw-bar thereon, a hanger in the draw-bar, a coupling, conduit sections movable in the hanger longitudinally of the car and laterally with the hanger as the draw-bar moves laterally, a U-shaped flexible connection united with each conduit and disposed in a plane transverse to the car, and stationary conduits extending under the car floor and longitudinally thereof, and each connected with one of said flexible connections, said last mentioned conduits being disposed in a common horizontal plane.

5. The combination of a car-body, a draw-bar thereon, a hanger fixed on the draw-bar and movable therewith, a coupling, horizontal conduits connected with the coupling and slidably mounted in the hanger and disposed one above another in a vertical plane, stationary conduits extending horizontally under the car, and flexible connections including pipe sections and elbows united by air by movable joints, the stationary conduits being disposed in a common horizontal plane and the upper and lowermost first-mentioned conduits being united by two of the flexible connections with the inner and outermost second-mentioned conduits, and the intermediate first and second-mentioned conduits being connected together by the remaining flexible connections, said flexible connections being U-shaped and disposed each in a plane transverse to the car.

6. In a conduit coupling for cars having train pipes arranged therebeneath and draw-bars similarly arranged centrally thereof and having suitable connecting members at their ends for connecting the cars, said drawbars being adapted for sidewise movement, hangers suspended from the draw-bars and embodying spaced frames, means to hold the frames in permanent spaced relation, pipe sections movably supported upon the spacing means of the frames in spaced relation vertically and held against upward movement at their inner ends, pipe connections between the conduits and pipe sections, said pipe sections projecting beyond the hangers and extremities of the cars, coupling heads for the conduits having orifices communicating with the pipe sections, spring means between each hanger and the adjacent coupling head to normally project the latter to coupling position and means supported by the hangers and actuated by the movements of the coupling heads of the conduits for locking the same together.

7. In a conduit coupling device for cars, conduits arranged beneath the same, said conduits being mounted for longitudinal and lateral displacement, hangers for supporting the conduits, coupling heads having orifices communicating with the conduits and removably connected thereto, said coupling heads also having side flanges and each flange having an opening, a notched projection carried by the flange of each head and adapted to enter the opening of the other flange on each head and a pivoted locking member carried by each head to engage the notched projection of the other head when the cars are coupled and the conduit heads are brought together, said locking members serving to draw the coupling heads together and being operated by the movements of the heads.

8. The combination with conduits adapted to be coupled; of coupling heads having orifices communicating with the conduits and removably connected thereto, said coupling heads comprising body portions having side flanges to guide the heads together, packing means at the extremities of the orifices to contact with the heads so coupled, one flange of each head having an intermediate opening, a notched projection carried by the flange of each head, a pivoted locking member carried by each head to engage the notched projection of the other head when the conduit heads are brought together and means coöperative with each locking member for moving said locking means in position to draw the heads together.

In testimony whereof I have signed my name to this specification in the presence of two subscribing witnesses.

WALLACE W. CARPENTER.

Witnesses:
JOHN E. BURCH,
PHILIP D. ROLLHAUS.